United States Patent [19]

Matsuoka et al.

[11] Patent Number: 4,641,920

[45] Date of Patent: Feb. 10, 1987

[54] OPTICAL ELEMENT HAVING THE FUNCTION OF CHANGING THE CROSS-SECTIONAL INTENSITY DISTRIBUTION OF A LIGHT BEAM

[75] Inventors: Kazuhiko Matsuoka; Masayuki Usui; Kazuo Minoura; Takesi Baba, all of Yokohama; Atsushi Someya, Machida, all of Japan

[73] Assignee: Canon Kabushiki Kaisha, Tokyo, Japan

[21] Appl. No.: 586,971

[22] Filed: Mar. 7, 1984

[30] Foreign Application Priority Data

Mar. 11, 1983 [JP] Japan ................................. 58-39143

[51] Int. Cl.⁴ ............................................. G02B 27/14
[52] U.S. Cl. ...................................................... 350/173
[58] Field of Search ........................................... 350/173

[56] References Cited

U.S. PATENT DOCUMENTS

| | | | |
|---|---|---|---|
| 2,189,298 | 2/1940 | Räntsch | 350/173 |
| 2,267,948 | 12/1941 | Räntsch | 350/173 |
| 3,230,851 | 1/1966 | Reymond | 350/173 |
| 3,419,898 | 12/1968 | Baldwin et al. | 350/173 |
| 3,517,327 | 6/1970 | Treuthart | 350/173 |
| 4,281,904 | 4/1981 | Sprague et al. | 350/356 |
| 4,370,026 | 1/1983 | Dubroeucq | 350/174 |

FOREIGN PATENT DOCUMENTS 132361  11/1978  Japan ................................. 350/401

Primary Examiner—William H. Punter
Attorney, Agent, or Firm—Fitzpatrick, Cella, Harper & Scinto

[57] ABSTRACT

An optical element having the function of changing the cross-sectional intensity distribution of an incident light beam is comprised of a plurality of prisms. The optical element spatially combines a light beam having been amplitude-divided by an amplitude-dividing mirror provided on the joined surface of the prisms and a light beam having been totally reflected by a total-reflection mirror provided on the outermost one of the prisms to thereby change the cross-sectional intensity distribution of the light beam entering the optical element.

9 Claims, 10 Drawing Figures

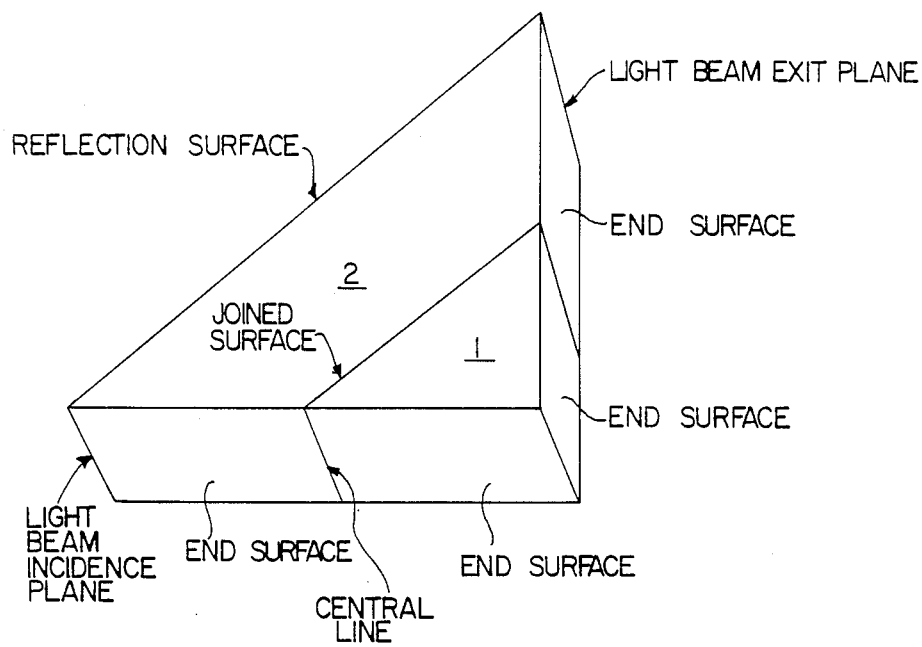
FIG. 1B
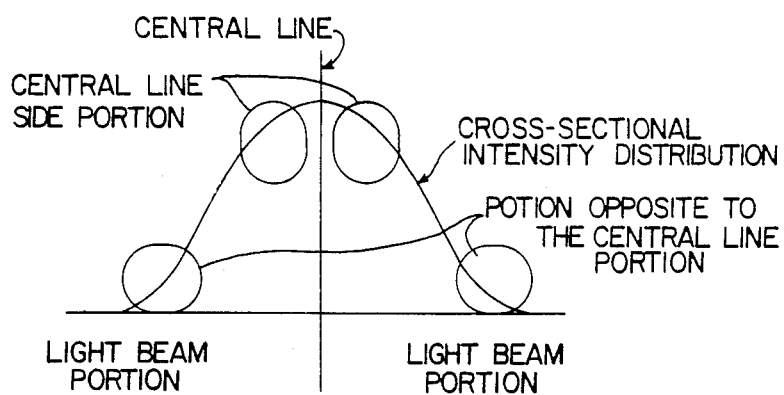
FIG. 1C

OPTICAL ELEMENT HAVING THE FUNCTION OF CHANGING THE CROSS-SECTIONAL INTENSITY DISTRIBUTION OF A LIGHT BEAM

BACKGROUND OF THE INVENTION

1. Field of the Invention

This invention relates to an optical element for use in a laser beam printer or a display and to an optical apparatus to which such element is applied.

2. Description of the Prior Art

As regards a light beam used in a laser beam printer or the like, it is generally known that an intensity distribution having an intensity of the marginal portion equal to or higher than the intensity of the central portion may result in more emphasized edge portion of the marginal portion of the spot of the light beam which may in turn result in higher resolution of printed-out matter than an intensity distribution having an intensity of the central portion higher than the intensity of the marginal portion, such as the Gaussian type intensity distribution of a laser beam which is a light source. A typical optical element used in such a laser beam printer or a light modulating element used therein for changing the unsuitable intensity distribution of the incident light beam into a suitable intensity distribution comprises a combination of two conical lenses, but it is difficult and impractical to work this element so as to have no eccentricity or to arrange and adjust this element to provide the angle of inclination of the surface of the element with respect to the optic axis within a set range. The optical element for changing the intensity distribution of such incident light beam is also required as an illuminating optical system for a light shutter array or the like. That is, where a laser beam is used at its intensity distribution as an illuminating light source, the intensity of the light of the marginal portion of the illuminating light beam is lower than that of the central portion of the illuminating light beam and this causes irregularity of the quantity of illuminating light to be created in the member to be illuminated. To eliminate this, there is known a method of enlarging the beam diameter of the laser beam sufficiently greatly as compared with the member to be illuminated, and illuminating said member by the use of a region which can be regarded as being practically uniform, but in this method, considerable part of the energy of the illuminating light which does not illuminate the member to be illuminated is wasted. Also, the use of the conical lenses as described above would cause a similar inconvenience.

In U.S. Pat. No. 4,370,026, it is disclosed that light beams divided into two by a prism are combined together by two mirrors to thereby achieve the uniformization of the distribution of quantity of light in the cross-section of a laser beam. However, it encounters a difficulty of alignment in the optical arrangement to discretely dispose the optical element for separating the laser beam and the optical element for re-combining the separated laser beams, as is disclosed in said U.S. patent.

SUMMARY OF THE INVENTION

It is an object of the present invention to provide an optical element capable of changing the cross-sectional intensity distribution of a light beam which solves the above-noted disadvantages.

It is another object of the present invention to provide an optical apparatus in which the above-described optical element is effectively disposed.

The optical element according to the present invention is comprised of a plurality of prisms, the joined surface of the adjacent prisms has the function of amplitude-dividing the incident light beam, the prism disposed in the outermost portion is formed so as to have a total reflection surface, and the light beams incident on the optical element are spatially combined together by the aforementioned joined surface and the total reflection surface, whereby the cross-sectional intensity of the light beam emerging from the optical element is changed.

In the optical element according to the present invention which will hereinafter be described, the basic shape of each of the prisms constituting the optical element is trapezoidal, the parallel surfaces of the prisms are joined together and the joined surface is endowed with the function of amplitude-dividing the incident light beam.

The invention will become more fully apparent from the following detailed description thereof taken in conjunction with the accompanying drawings.

DESCRIPTION OF THE DRAWINGS

FIG. 1B shows two prisms having a joined surface therebetween.

FIG. 1C shows the cross-sectional energy distribution of a light beam incident on the two prism assembly of the type shown in FIGS. 1A and 1B.

DESCRIPTION OF THE PREFERRED EMBODIMENTS

Figure 1A:
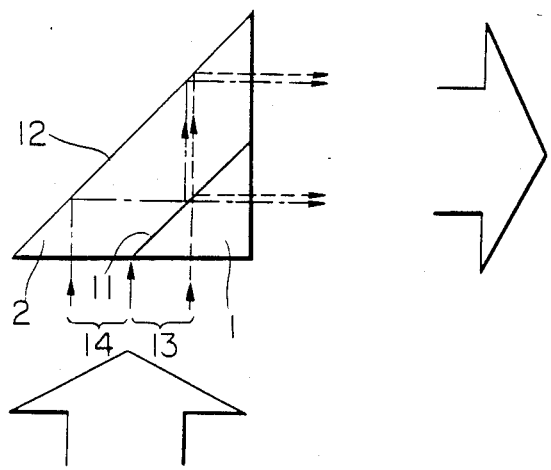
FIG. 1A illustrates the principle of an optical element in accordance with the present invention.

Referring to FIGS. 1A and 1B which illustrates the principle of the present invention, reference numerals 1 and 2 designate prisms cemented and joined together. Alternatively, the prisms may be joined together with an air gap intervening therebetween. The joined prisms have a light beam incidence plane and a light beam exit plane wherein each incidence plane has an even number of end surfaces. These incident plane end surfaces are disposed symmetrically with respect to a central line dividing the incidence plane. The joined surface 11 has a function as a half-mirror, and the outer surface 12 of the prism 2 has a function as a total reflection mirror. In FIG. 1A, a parallel light beam enters this optical element from the lower portion thereof. Describing first the parallel light beam 13 which has directly entered the prism 1, a parallel light beam decreased to one half quantity of light by the action of the joined surface 11 via an optical path indicated by the broken line emerges from the prism 1 to the right as viewed in FIG. 1A. The parallel light beam of the remaining one half quantity of light travels to the prism 2, is totally reflected by the outer surface 12 and exits as a parallel light beam from the prism 2 also to the right as viewed in FIG. 1A. Next, a parallel light beam 14 which has directly entered the prism 2 is totally reflected by the outer surface 12 as indicated by a dot-and-dash line, whereafter each one half of the incident quantity of light exits as a parallel light beam from the prisms 1 and 2, respectively. That is, the light beam 14 which has entered the prism 2 is first totally reflected by the outer surface 12 and travels to the right as viewed in FIG. 1A. This light beam totally reflected by the outer surface 12 is amplitude-divided by the joined surface 11, and one half of the light beam is transmitted intact through the joined surface 11 and exits to the right of the prism 1 as viewed in FIG. 1A. On the other hand, the remaining one half of the light beam which has been reflected by the joined surface 11 is again totally reflected by the outer surface 12 and exits to the right of the prism 2 as viewed in FIG. 1A. FIG. 1C shows the cross-sectional energy distribution of a light beam incident on the two prism assembly shown in FIGS. 1A and 1B. FIG. 2 illustrates the principle of changing a parallel light beam having a Gaussian type intensity distribution into a parallel light beam having a substantially uniform intensity distribution. Let it be assumed that a parallel light beam having the Gaussian type intensity distribution shown in FIG. 2A as viewed in the direction of incidence of the light in a plane parallel to the plane of the drawing sheet enters the optical element shown in FIG. 1A. In this case, the intensity distribution of the one half light beam 13 of the whole incident light beam entering the prism 1 is indicated by the broken line 13a and the intensity distribution of the remaining one half light beam 14 entering the prism 2 is indicated by the dot-and-dash line 14a (but the peak value of the intensity of the light is $2L_1$). Of the incident light beam 13 which has directly entered the prism 1, the intensity distributions of the light beams amplitude-divided and exiting from the prisms 1 and 2, respectively, as viewed in the direction of emergence of the light are indicated by broken lines 15 and 18 in FIG. 2B. Also, of the remaining one half incident light beam which has directly entered the prism 2, the intensity distributions of the light beams amplitude-divided by the joined surface 11 and exiting from the prisms 1 and 2, respectively, as viewed in the direction of emergence of the light are indicated by dot-and-dash lines 16 and 17 in FIG. 2B. Also, curves 19 and 20 indicated by solid lines in FIG. 2B show the intensity distributions of the light when the light beams having emerged from the prisms 1 and 2 are combined together in the space. Of the incident light beam 13 which directly enters the prism 1, the intensity distribution 18 of the light beam reflected by the joined surface 11 of the prism 1 and exiting from the prism 1 and the intensity distribution 15 of the remaining light beam transmitted through the joined surface 11 and reflected by the outer surface 12 and then exiting from the prism 2 assume a shape similar to the shape in which the intensity distribution of the incident light beam has been inverted. Also, of the remaining one half incident light beam 14 which enters the prism 2, the intensity distribution 17 of the light beam reflected by the outer surface 12 and transmitted through the joined surface 11 and exiting from the prism 1 and the intensity distribution 16 of the remaining incident light beam totally reflected by the outer surface 12 and then reflected by the joined surface 11 and again totally reflected by the outer surface 12 and exiting from the prism 2 assume a shape similar to the shape in which the intensity distribution of the incident light beam has been inverted. The intensity distributions of these light beams assume a symmetrical shape in the prism 1 or 2 and therefore, the intensity distribution of the light beam in which the intensity distributions of these light beams have been combined together becomes substantially uniform as indicated by solid lines 19 and 20 in FIG. 2B. It is apparent that if not in a plane parallel to the plane of the drawing sheet, when a light beam having the intensity distribution as shown in FIG. 2A enters the optical element, a light beam having the intensity distribution as shown in FIG. 2B exits from the optical element.

Now, where a light having a good interferential property such as a laser beam is used as a light source, fine interference fringes are created on the surface to be illuminated. Depending on the purpose of using such light source, there occurs the need for preventing the interference fringes from being created, and in this case, it is possible to use a laser light source generating a linearly polarized light as a light source and provide a wavelength plate such as a $\lambda/2$ plate for turning the direction of polarization perpendicularly to the incidence side and face of one of the prisms 1 and 2 in FIG. 1A to make the direction of polarization of the light beam 13 entering the prism 1 orthogonal to the direction of polarization of the light beam 14 entering the prism 2 and thereby prevent the interference fringes from being created.

Figure 2A:
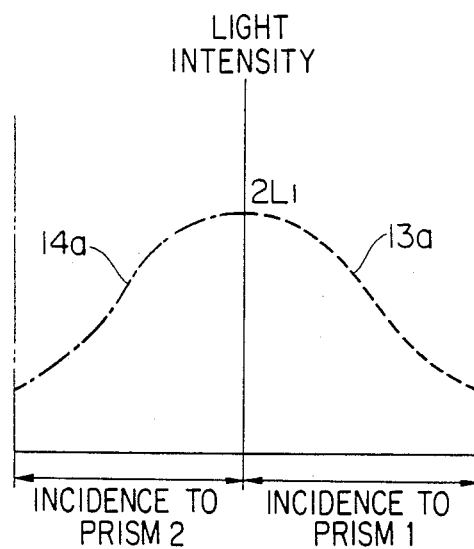
FIGS. 2A and 2B are illustrations of the light intensity distribution for explaining the optical element shown in FIG. 1.
Figure 2B:
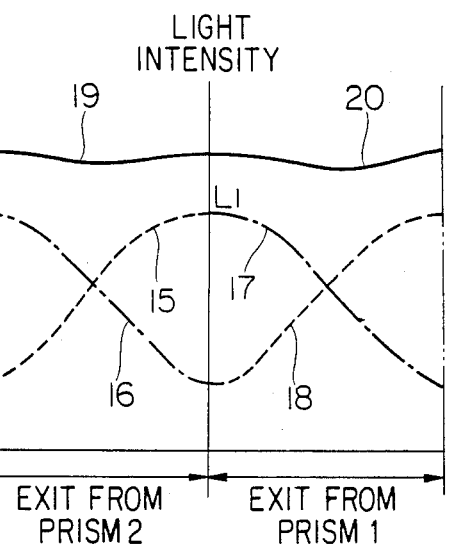
Figure 3:
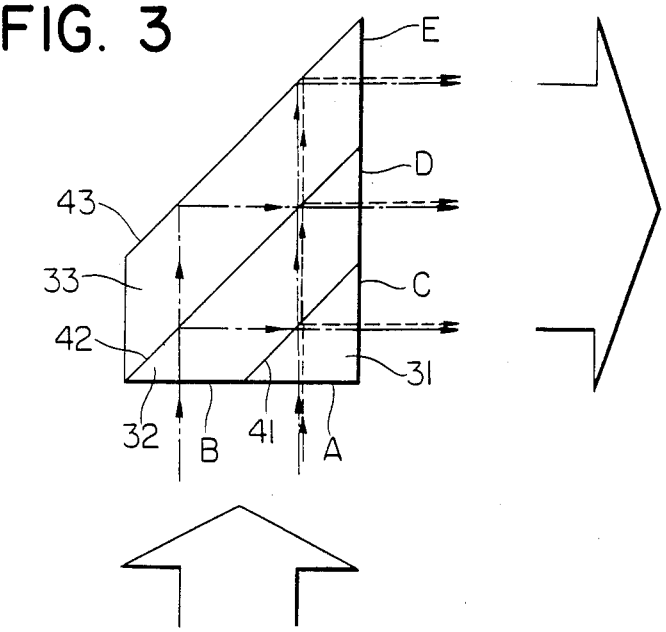
FIG. 3 illustrates another embodiment of the optical element in accordance with the present invention.

For simplicity of illustration, an optical element comprising two prisms has been shown in FIGS. 2A and 2B, but it is shown by the use of another embodiment of the optical element according to the present invention shown in FIG. 3 that changing of the light intensity distribution and magnification change of the light beam diameter can be accomplished by the use of more prisms. In FIG. 3, reference numerals 31, 32 and 33 designate prisms and reference numerals 41 and 42 denote amplitude-dividing mirrors having reflection factors $R_{41}$ (transmission factor $(1-R_{41})$) and $R_{42}$ (transmission factor $(1-R_{42})$). The prisms 31 and 32 are joined together and the prisms 32 and 33 are joined together. Denoted by 43 is a total reflection mirror provided on the outer surface of the prism 33. Surfaces A and B are the light beam incidence side surfaces of the prisms 31 and 32, respectively, and surfaces C, D and E are the light beam exit side surfaces of the prisms 31, 32 and 33. A light beam having entered the surface A is subjected to amplitude division by the amplitude-dividing mirrors 41 and 42 as indicated by broken lines, whereafter the amplitude-divided light beams exit from the surfaces C, D and E, respectively. Also, a light beam having entered the surface B is amplitude-divided by the amplitude-dividing mirrors 41 and 42 as indicated by dot-and-dash lines, whereafter the amplitude-divided light beams exit from the surfaces C, D and E, respectively. The light beams exiting from these surfaces C, D and E are spatially combined together and changing of the light intensity distribution and magnification change of the light beam diameter are effected.

Assuming that the rates of the light beams exiting from the surfaces C, D and E to the intensity of the light beam having entered the surface A (1 for 100%) are $C_A$, $D_A$ and $E_A$, respectively, the rate of the intensity of the light beam reflected by the amplitude-dividing mirror 41 and exiting from the surface C is $$C_A = R_{41}$$

and the rate of the light beam transmitted through the amplitude-dividing mirror 41 is $1 - R_{41}$ and therefore, the rate of the intensity of the light beam reflected by the amplitude-dividing mirror 42 and exiting from the surface D is $$D_A = (1 - R_{41})R_{42}$$

and the transmission factor of the amplitude-dividing mirror 42 is $(1 - R_{42})$ and therefore, the rate of the intensity of the light beam transmitted through the amplitude-dividing mirror 42 and reflected by the total reflection mirror 43 and exiting from the surface E is $$E_A = (1 - R_{41})(1 - R_{42}).$$

Likewise, assuming that the rates of the light beams exiting from the surfaces C, D and E to the intensity of the light beam having entered the surface B (1 for 100%) are $C_B$, $D_B$ and $E_B$, respectively, the rate of the intensity of the light beam reflected by the amplitude-dividing mirror 42 and transmitted through the amplitude-dividing mirror 41 and exiting from the surface C is $$C_B = R_{42}(1 - R_{41})$$

and the rate of the intensity of the light beam reflected by the amplitude-dividing mirror 42 and further reflected by the amplitude-dividing mirror 41 is $R_{42} \cdot R_{41}$ and the rate of the intensity of the light beam reflected by the amplitude-dividing mirror 42 and exiting from the surface D is $R_{41} \times R_{42}^2$. Also, the rate of the intensity of the light beam transmitted through the amplitude-dividing mirror 42 and totally reflected by the total reflection mirror 43 and exiting from the surface E is $R_{41}R_{42}(1 - R_{42})$. Also, the rate of the intensity of the light beam transmitted through the amplitude-dividing mirror 42 and totally reflected by the total reflection mirror 43 is $(1 - R_{42})$ and further, the rate of the intensity of the light beam transmitted through the amplitude-dividing mirror 42 and exiting from the surface D is $(1 - R_{42})^2$. Also, the rate of the intensity of the light beam reflected by the amplitude-dividing mirror 42 and then totally reflected by the total reflection mirror 43 and exiting from the surface E is $R_{42}(1 - R_{42})$. Therefore, $$E_B = R_{41} \cdot R_{42}^2 + (1 - R_{42})^2$$

and $$E_B = R_{41} \cdot R_{42}(1 - R_{42}) + R_{42}(1 - R_{42}).$$

Now, in order that the emergent light beams may be substantially equal in intensity, $C_A$, $D_A$, $E_A$, $C_B$, $D_B$ and $E_B$ must be substantially equal to $\frac{1}{3}$. If they are equal to $\frac{1}{3}$, from the foregoing, $$R_{41} \approx 0.333, \quad R_{42} = 0.5.$$

Figure 4A:
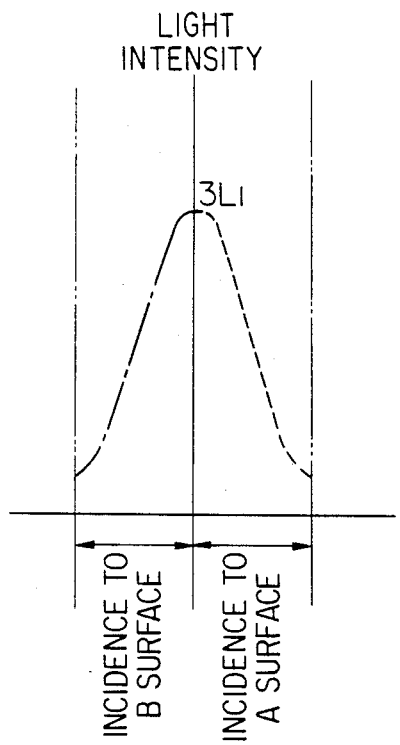
FIGS. 4A and 4B are illustration of the light intensity distribution for explaining the optical element shown in FIG. 3.
Figure 4B:
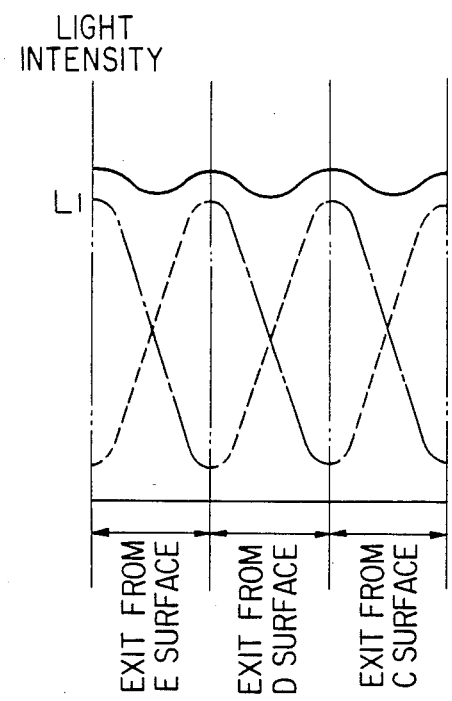

As can be seen from the above-described embodiment, in an optical element comprising three prisms, by setting $R_{41}$ and $R_{42}$ to the above-mentioned values, it is possible to obtain uniform light intensity distribution of the emergent light beams and, if the acute angle portions of the prisms 31 and 32 are set to 45°, the diameters of the light beams having entered the surfaces A and B are equal to the diameters of the light beams exiting from the surfaces C and D. However, in the case of the present embodiment, a light beam exits also from the surface E and correspondingly, the diameter of the light beam is enlarged relative to the diameter of the incident light beam. FIGS. 4A and 4B shows a state in which the cross-sectional intensity distribution of the light beam when the light beam having a Gaussian type cross-sectional intensity distribution which enters the optical element of FIG. 3 (the peak value of the intensity is $3L_1$) has emerged from the optical element is uniformized. In FIGS. 4A and 4B curves indicated by broken lines show the intensity distributions of the lights entering the surface A and exiting from the surfaces C, D and E. Also, curves indicated by dot-and-dash lines show the intensity distributions of the lights entering the surface B and exiting from the surfaces C, D and E. Further, a curve indicated by solid line shows the intensity distribution when the intensity distributions of these light beams are spatially combined together. Further description of FIGS. 4A and 4B is omitted because it is self-evident. (Also, in the case of the above-described embodiment, it is apparent that if, as in the embodiment described in connection with FIG. 1A, a light beam having a three-dimensionally mountain-shaped Gaussian type intensity distribution enters the optical element of the present embodiment, a light beam also having a substantially uniformized, three-dimensionally elliptic cylindrical intensity distribution exits from the optical element.) Also, an optical element comprising four or more prisms can be constructed by designing it in the same manner as described above. In addition, changing of the intensity distribution of any light beam becomes possible by suitably selecting $R_{41}$ and $R_{42}$. Further, when it is desired to obtain a Gaussian type intensity distribution from a light beam having a predetermined intensity distribution, the incidence side and the exit side of the optical element shown in FIGS. 1A or 3 may be reversed to each other.

Figure 5:
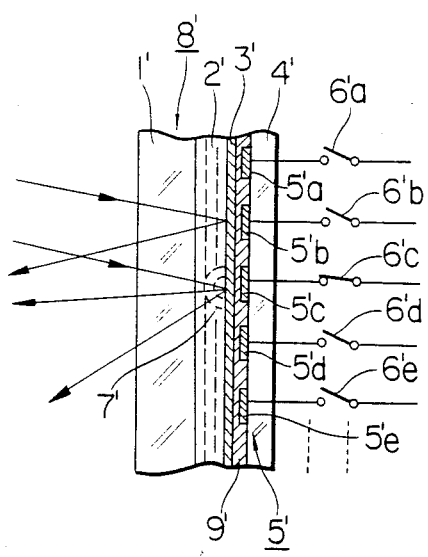
FIG. 5 is a fragmentary cross-sectional view of a light modulating element used in an optical apparatus in accordance with the present invention.

FIG. 5 is a fragmentary cross-sectional view of an example of a light modulating element used in the optical apparatus according to the present invention.

Reference numeral 4' designates an insulative substrate, reference characters 5'a, 5'b, 5'c, 5'd, 5'e, . . . denote heat-generating resistance members as heat-generating elements formed of a thin film of indium tin oxide or like material and arranged in a row, reference numeral 9' designates an insulating layer, reference numeral 3' denotes a mirror, reference numeral 2' designates a liquid layer formed, for example, of an organic solvent as a member to be heated, and reference numeral 1' denotes a transparent protective plate. These are layered in the named order to constitute a light modulating element 8'. Reference characters 6'a, 6'b, 6'c, . . . designate switches connected to the heat-generating resistance members 5'a, 5'b, 5'c, . . . , respectively. When the switches 6'a, 6'b, 6'c, . . . are not closed, the heat-generating resistance members 5'a, 5'b, 5'c, . . . are not supplied with power and heated and therefore, the temperature of the liquid layer 2' is uniform and accordingly, a light incident at a certain angle is regularly reflected by the mirror 3' and exits from the light modulating element 8' at a certain angle. However, when the switch 6'c is closed and the heat-generating resistance member 5'c is supplied with power and heated, the temperature of the liquid layer 2' which has received such heat rises locally and with this temperature rise, there is created a gradient index area 7' in which the refractive index differs from that of the other portion of the liquid layer 2'. Accordingly, the light entering this area 7' is refracted and changes its optical path and exits from the light modulating element as a divergent light having an expanse as shown. While the light modulating element has been described as a reflection type one, a transmission type light modulating element is also possible by eliminating the mirror 3' and making the substrate 4' and the insulating layer 9' transparent to light. Also, the liquid layer 2' may be locally heated and boiled and vapor bubbles may be formed therein, and the optical path may be changed by the vapor bubbles to thereby effect light modulation. Also, an infrared ray absorbing layer may be used instead of the heat-generating resistance members and infrared ray may be applied thereto to cause heat generation thereof. In the above embodiment, liquid is used as the member for changing the optical path, but instead, a solid may be used. The detailed principle and construction of this light modulating element are described by our U.S. application Ser. No. 539,675, filed Oct. 6, 1983, (corresponding to Japanese Patent Application Nos. 178154/1982 filed Oct. 9, 1982; 179265/1982 filed Oct. 13, 1982; 54339/1983 filed Mar. 30, 1983; 63868/1983 filed Apr. 12, 1983; 63869/1983 filed Apr. 12, 1983; 72427/1983 filed Apr. 25, 1983; 75833/1983 filed Apr. 28, 1983; 75835/1983 filed Apr. 28,1983; 88668/1983 filed May 19, 1983; and 103730/1983 filed June 10, 1983) and therefore need not be described any further. In the case of the present embodiment, the light entering the cross-section in the direction of arrangement of the heat-generating resistance members 5'a, 5'b, 5'c, . . . and reflected thereby has been described, but what has been described above also applies to the light entering the surface orthogonal to the direction of arrangement of the heat-generating resistance members 5'a, 5'b, 5'c, . . . and reflected thereby. When the supply of power to the heat-generating resistance member 5'c is cut off, the gradient index area 7' will be cooled and naturally disappear, and this also holds true of the vapor bubbles.

Further, the light modulating element may also be a light modulating element of the type in which, as shown in U.S. Pat. No. 4,281,904, the electric field distribution in a crystal having an electro-optic effect is varied and a light beam entering the portion in which the refractive index in the crystal created with this electric field distribution is varied is refracted to effect modulation.

Figure 6:
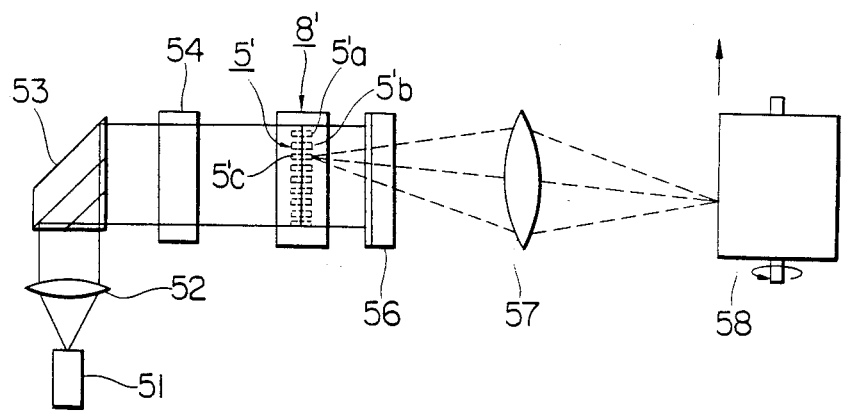
FIG. 6 is a top plan view of an embodiment of the optical apparatus using the optical element in accordance with the present invention.

FIG. 6 is a top plan view of an embodiment in which the optical element according to the present invention is applied to an image forming apparatus as an optical apparatus.

Reference numeral 51 designates a laser light source which generates, for example, a light beam having a Gaussian type intensity distribution. Reference numeral 52 denotes a collimater lens, and reference numeral 53 designates an optical element according to the present invention. In the case of the present embodiment, the optical element having the construction shown in FIG. 3 is used as the optical element 53. Reference numeral 54 denotes a cylindrical lens, and reference numeral 8' designates an example of the light modulating element which, in the present embodiment, is of the construction shown in FIG. 5, and in FIG. 6, a heater array 5' or the like comprising heat-generating resistance members 5'a, 5'b, 5'c, . . . is simply shown. Reference numeral 56 designates a light-intercepting plate having a sufficient size to intercept only the regularly reflected light from the light modulating element 8', reference numeral 57 denotes a projection lens for projecting the divergent light from the light modulating element 8', and reference numeral 58 designates a photosensitive drum rotatable in the direction of arrow. The position of the surface of the photosensitive drum 58 is a position optically conjugate with the heat-generating resistance member row 5' through the projection lens 57.

Operation of the present embodiment will now be described by reference to FIGS. 5 and 6. The laser beam from the laser light source 51 is made into a parallel light beam by the collimater lens 52, and thereafter is converted into a parallel light beam having a substantially uniform intensity distribution by the optical element 53, as described in connection with FIG. 3. The parallel light beam exiting from the optical element 53 is linearly condensed on the mirror 3' on the heater array 5' by the cylindrical lens 54. At this time, the direction in which the changing of the light beam having the cross-sectional intensity distribution has been effected by the optical element 53 is made substantially coincident with the direction of linear condensation. When the heater array 5' is not supplied with power and heated, the linearly condensed light beam is regularly reflected by the mirror 3' and is all intercepted by the light-intercepting plate 56. Assuming that, of the heater array 5' of the light modulating element 8', the heat-generating resistance member 5'c is supplied with power and heated, a gradient index area or vapor bubbles are formed in the portion of the liquid layer 2 thereon. The light entering this portion and exiting therefrom becomes a divergent light so shown by broken lines, and most of this divergent light is not intercepted by the light-intercepting plate 56 but is imaged as a point image on the photosensitive drum 58 by the projection lens 57. Accordingly, by driving the heater array 5' in accordance with image signals, an image comprising an aggregate of point images corresponding to the image signals is formed in the direction of arrow on the surface of the photosensitive drum 58. By repeating this scanning, coupled with the rotation of the photosensitive drum 58, a two-dimensional image is formed on the surface of the photosensitive drum 58. Thereafter, the electrostatic latent image formed on the photosensitive drum 58 may be suitably processed by known means and the image may be formed on paper or the like. As an alternative, the heater array 5' of the light modulating element 8' need not be scanned but at the same time, the required heat-generating resistance members of the heater array 5' may be supplied with power and heated, whereby an aggregate of linear point images may be formed on the photosensitive drum 58 at the same time. Also, a screen may be disposed instead of the photosensitive drum 58, and a galvano mirror for scanning in a direction orthogonal to the array direction of the heater array 5' may be disposed between the screen and the projection lens 57 and further, if required for the correction of aberrations, an imaging lens may be disposed between the galvano mirror and the screen, whereby it is possible to form and display a two-dimensional image on the screen.

What is important in the image forming apparatus as the optical apparatus shown in FIG. 6 is that the optical element 53 according to the present invention is used, whereby the light beam has a uniform intensity distribution in the array direction of the heater array 5' and is enlarged to a sufficient width to sufficiently irradiate the heater array 5'. Accordingly, the intensity of the point image formed on the photosensitive drum 58 is substantially uniform and thus, there is obtained an image of high resolution.

As has hitherto been described, the optical element according to the present invention is capable of converting the intensity distribution of a light beam into a desired light intensity distribution by a simple construction and also accomplishing the changing of the light beam diameter easily. An image forming apparatus such as a light printer or a display provided with the optical element according to the present invention can provide images of high resolution and high quality which are free of irregularity.

What we claim is:

1. An optical apparatus comprising:
   a light source unit for generating a light beam which has a generally symmetrical cross-sectional intensity about a central ray thereof;
   an optical element for receiving on an incidence plane thereof a light beam from said light source unit and substantially equalizing a cross-sectional intensity distribution of the light beam, said light source unit being positioned so that the incident position of the central ray of the incident light beam generally coincides with a central line of the light beam incident plane;
   said optical element including:
   a plurality of prisms each having at least two end surfaces, and at least one having an externally facing surface;
   at least one joined surface formed by joining one said prism to another said prism, said joined surface having the function of amplitude-dividing the light beam and causing it to have a substantially uniform characteristic over the total area thereof;
   a first group comprising one end surface of each of an even number of said prisms being arranged to form said light beam incidence plane which thus includes an even number of said end surfaces of said prisms, said even number of said end surfaces of said first group being disposed symmetrically with respect to a central line between two of said end surfaces of said first group, said central line thereby symmetrically dividing said light beam incidence plane and forming at least one set of paired symmetrical end surfaces of said first group;
   a light beam exit plane formed by arranging a second group of end surfaces of said prisms; and
   at least one reflection surface formed by said externally facing surface of at least one of said prisms;
   the relationship of said reflection surface and said joined surface relative to said light beam incidence plane and to said light beam exit plane, the amplitude dividing rate of said joined surface, and the reflection factor of said reflection surface being such as to cause incident light beam portions incident on each set of said paired symmetrical end surfaces of said light beam incidence plane to emerge from each end surface of said light beam exit plane such that the cross-sectional intensity distribution of one of said incident light beam portions incident on said light beam incidence plane on one side of said central line and the cross-sectional intensity distribution of another of said incident light beam portions incident on said light beam incidence plane on the other side of said central line are superposed and that equal parts of the quantity of light of said one and said other light beam portions are combined so that the light beam emergent from said light beam exit plane has a substantially uniform intensity distribution.

2. An optical apparatus according to claim 1, wherein said reflection surface is a total reflection mirror surface.

3. An optical apparatus according to claim 2, wherein the number of said prisms is two and said light beam incidence plane is perpendicular to said light beam exit plane.

4. An optical apparatus according to claim 2, wherein the number of said prisms is three, said even number is two and said light beam incidence plane is perpendicular to said light beam exit plane.

5. An optical apparatus comprising:
   a light source unit for generating a light beam which has a generally symmetrical cross-sectional intensity about a central ray thereof;
   an optical element for receiving on an incidence plane thereof a light beam from said light source unit and substantially equalizing a cross-sectional intensity distribution of the light beam, said light source being positioned so that the incident position of the central ray of the incident light beam generally coincides with a central line of the light beam incidence plane;
   said optical element including;
   a plurality of prisms each having at least two end surfaces, and at least one having an externally facing surface;
   at least one joined surface formed by joining one said prism to another said prism, said joined surface having the function of amplitude-dividing the light beam and causing it to have a substantially uniform characteristic over the total area thereof;
   a first group comprising one end surface of each of an even number of said prisms being arranged to form said light beam incidence plane which thus includes an even number of said end surfaces of said prisms, said even number of said end surfaces of said first group being disposed symmetrically with respect to a central line between two of said end surfaces of said first group, said central line thereby symmetrically dividing said light beam incidence plane and forming at least one set of paired symmetrical end surfaces of said first group;
   a light beam exit plane formed by arranging a second group of end surfaces of said prisms; and
   at least one reflection surface formed by said externally facing surface of at least one of said prisms;
   the relationship of said reflection surface and said joined surface relative to said light beam incidence plane and to said light beam exit plane, the amplitude-dividing rate of said joined surface, and the reflection factor of said reflection surface being such as to cause incident light beam portions incident on each set of said paired symmetrical end surfaces of said light beam incidence plane to emerge from each end surface of said light beam exit plane such that the cross-sectional intensity distribution of one of said light beam portions and incident on said light beam incidence plane on one side of said central line and the cross-sectional intensity distribution of another of said light beam portions incident on said light beam incidence plane on the other side of said central line are superposed and that equal parts of the quantity of light of said one and said other light beam portions are combined so that the light beam emergent from the light beam exit plane has a substantially uniform intensity distribution; and said optical apparatus further comprising:
a light modulating element for modulating the light beam emergent from said light beam exit plane of said optical element, said light modulating element including a plurality of light modulating portions capable of effecting a light modulation.

6. An optical apparatus according to claim 5, wherein said light modulating element includes a predetermined medium and means for applying heat to said predetermined medium thereby to cause distributions of different reflective indices to be created in said medium which modulate the incident light beam by said reflective index distributions.

7. An optical apparatus according to claim 5, wherein said light modulating element includes a liquid layer and means for applying heat to said liquid layer to thereby form vapor bubbles in said liquid layer which modulate the incident light beam.

8. An optical apparatus according to claim 5, wherein said light modulating element includes a crystal having an electro-optic effect and the electric field distribution in said crystal is varied thereby to vary the refractive index of said crystal and modulate the incident light beam.

9. An optical apparatus according to claim 5, further comprising an optical system for selectively directing to a light-receiving medium a light beam modulated by said light modulating element and a light beam not modulated by said light modulating element.

* * * * *

UNITED STATES PATENT AND TRADEMARK OFFICE
CERTIFICATE OF CORRECTION

PATENT NO. : 4,641,920

DATED : February 10, 1987

INVENTOR(S) : Matsuoka, et al.

It is certified that error appears in the above-identified patent and that said Letters Patent is hereby corrected as shown below:

SHEET 2 OF 4 IN THE DRAWINGS

In FIG. 1C, "POTION" should read --PORTION--.

SHEET 4 OF 4 IN THE DRAWINGS

"FIG. 1B" and "FIG. 1C" should be deleted and --FIG. 5-- and --FIG. 6-- substituted therefor as shown on the attached sheet.

COLUMN 2

Line 38, "illustration" should read --illustrations--.
Line 50, "illustrates" should read --illustrate--.
Line 61, "has, a" should read --has a--.

COLUMN 4

Line 33, "FIGS. 2A and 2B" should read --FIGS. 1A and 1B--.

COLUMN 5

Line 34, "$R_{42}{}^2$" should read --$R^2{}_{42}$--.
Line 51, "$R_{42}{}^2$" should read --$R^2{}_{42}$--.

UNITED STATES PATENT AND TRADEMARK OFFICE
CERTIFICATE OF CORRECTION

PATENT NO. : 4,641,920

DATED : February 10, 1987

INVENTOR(S) : Matsuoka, et al.

It is certified that error appears in the above-identified patent and that said Letters Patent is hereby corrected as shown below:

COLUMN 6

Line 7, "shows" should read --show--.

COLUMN 7

Line 29, "28,1983" should read --28, 1983--.
Line 49, delete "is refracted".

Signed and Sealed this

Ninth Day of June, 1987

Attest:

DONALD J. QUIGG

Attesting Officer

Commissioner of Patents and Trademarks